(12) United States Patent
Jamkhedkar et al.

(10) Patent No.: US 11,055,719 B2
(45) Date of Patent: Jul. 6, 2021

(54) MULTI-TENANT DISPUTE SERVICES

(71) Applicant: PayPal, Inc., San Jose, CA (US)

(72) Inventors: Prashant Jamkhedkar, Freemont, CA (US); Aravindan Ranganathan, San Jose, CA (US); Sandeep Kumar, Fremont, CA (US); Mavendra Sharma, Fremont, CA (US); Norihiro Aoki, San Jose, CA (US); Justin White, La Selva, CA (US); Jeffrey David Meyer, Los Gatos, CA (US)

(73) Assignee: PAYPAL, INC., San Jose, CA (US)

(*) Notice: Subject to any disclaimer, the term of this patent is extended or adjusted under 35 U.S.C. 154(b) by 196 days.

(21) Appl. No.: 16/235,976

(22) Filed: Dec. 28, 2018

(65) Prior Publication Data

US 2019/0385168 A1 Dec. 19, 2019

Related U.S. Application Data

(63) Continuation-in-part of application No. 16/009,994, filed on Jun. 15, 2018.

(51) Int. Cl.
*G06Q 20/40* (2012.01)
*G06Q 50/18* (2012.01)
*H04L 29/08* (2006.01)
*G06Q 30/00* (2012.01)

(52) U.S. Cl.
CPC ....... *G06Q 20/407* (2013.01); *G06Q 20/4016* (2013.01); *G06Q 50/182* (2013.01); *H04L 67/12* (2013.01); *G06Q 30/016* (2013.01)

(58) Field of Classification Search
CPC ............. G06Q 20/407; G06Q 20/4016; G06Q 50/182; G06Q 30/016; H04L 67/12
See application file for complete search history.

(56) References Cited

U.S. PATENT DOCUMENTS

| | | | |
|---|---|---|---|
| 7,657,639 B2 | 2/2010 | Hinton | |
| 8,918,641 B2 | 12/2014 | Smith et al. | |
| 9,218,599 B1* | 12/2015 | Hilbring | G06Q 20/407 |
| 2002/0010591 A1* | 1/2002 | Pomerance | G06Q 50/182 |
| | | | 705/309 |

(Continued)

*Primary Examiner* — Taghi T Arani
*Assistant Examiner* — Joshua Raymond White
(74) *Attorney, Agent, or Firm* — Haynes and Boone, LLP

(57) ABSTRACT

A method for processing disputes in a multi-tenant architecture system includes receiving, at a first service provider, a dispute request from a second service provider that manages entity identities of a plurality of customers. The dispute request indicates a disputed transaction between a customer of the plurality of customers and another entity. The method includes accessing an identity manager to determine a customer representation, the identity manager previously onboarded the plurality of customers as a plurality of customer representations. The identity manager is hosted by the first service provider that manages customer representations corresponding to entity identities of the customers. The dispute request is propagated with the customer representation to a dispute management engine that determines an outcome for the dispute, the determination based on characteristics of the disputed transaction and on characteristics of the customer. The method also includes propagating the determination to the second service provider.

19 Claims, 7 Drawing Sheets

(56) References Cited

U.S. PATENT DOCUMENTS

| | | |
|---|---|---|
| 2004/0117298 A1* | 6/2004 | Algiene .............. G06Q 20/102 |
| | | 705/39 |
| 2007/0150480 A1 | 6/2007 | Hwang et al. |
| 2008/0154783 A1* | 6/2008 | Rule ................... G06Q 50/188 |
| | | 705/80 |
| 2011/0276892 A1 | 11/2011 | Jensen-Horne et al. |
| 2012/0072307 A1 | 3/2012 | Kassaei et al. |
| 2012/0197963 A1 | 8/2012 | Bouw et al. |
| 2013/0046600 A1 | 2/2013 | Coppinger |
| 2014/0230076 A1 | 8/2014 | Micucci et al. |
| 2015/0161620 A1* | 6/2015 | Christner .......... G06Q 30/0185 |
| | | 705/318 |
| 2015/0193775 A1* | 7/2015 | Douglas ............ G06Q 30/0253 |
| | | 705/14.23 |
| 2015/0193858 A1 | 7/2015 | Reed et al. |
| 2016/0337365 A1* | 11/2016 | Beiter ................... H04L 63/102 |
| 2017/0048306 A1 | 2/2017 | Amador |
| 2017/0318128 A1 | 11/2017 | Ananthanarayanan et al. |
| 2018/0075231 A1 | 3/2018 | Subramanian et al. |
| 2018/0081905 A1* | 3/2018 | Kamath ............... G06F 16/248 |

* cited by examiner

MULTI-TENANT DISPUTE SERVICES

This application claims the benefit of and is a continuation-in-part of U.S. application Ser. No. 16/009,994, titled "Unified Identity Services for Multi-Tenant Architectures," filed on Jun. 15, 2018, the disclosure of which is incorporated herein by reference in its entirety.

BACKGROUND

Embodiments of the present disclosure generally relate to the field of software architecture and, more particularly, to managing how various entities are on-boarded, managed, and/or accessed in a multi-tenant system architecture.

Complex software systems can have various architectures, including a single-tenant software architecture and a multi-tenant software architecture, among others. In a single-tenant software architecture, each entity (such as a company or a portion of that company) can have their own instances of each software application, data, and any supporting infrastructure. In a single-tenant architecture, the software for each tenant entity can be customized as desired. However, drawbacks of using the single tenant architecture include expense in resources, as well as requirements to host, customize, and maintain separate software applications for each tenant.

In contrast, in a multi-tenant software architecture, each entity can share the same instances of applications, data, and/or infrastructure. A multi-tenant software provider can provision their applications and/or resources to multiple entities from a single software architecture. In multi-tenant software architecture, access to data can be shared among the various entities. By sharing much of the applications, data, and software, various resources such as installation, configuration, number of physical servers, maintenance, and even power can be optimized. However, drawbacks of using multi-tenant architecture include complexity of managing how multiple software applications are configured and shared among multiple clients. Also, design of multi-tenant architecture-based software systems that provides secure and reliable access to the data, resources, and/or transaction services that operate using the data and/or resources can be problematic. Furthermore, interoperability difficulties may arise when using software applications, in a multi-tenant architecture system, that were initially managed and/or hosted by different businesses.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
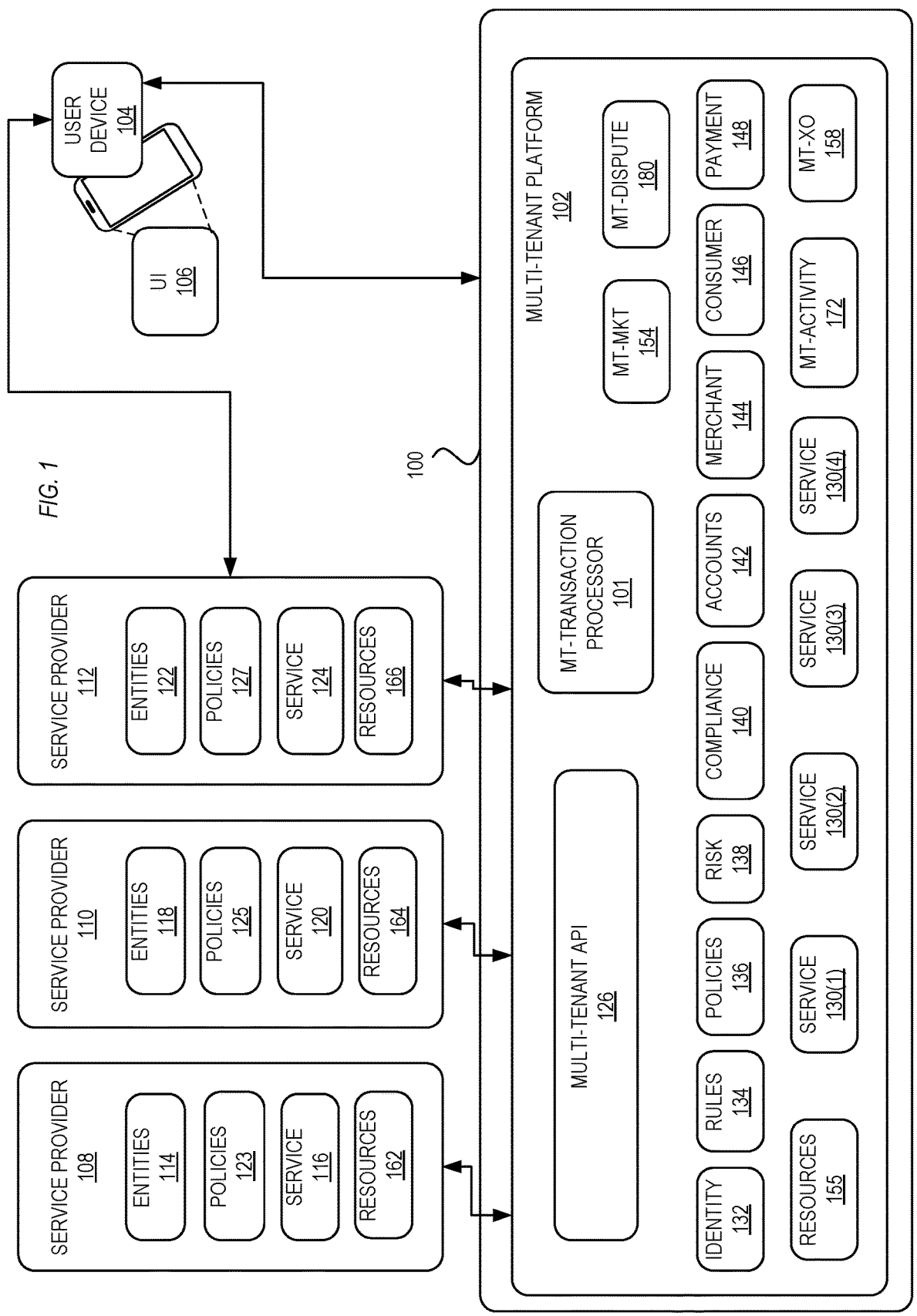
FIG. 1 is a system diagram illustrating embodiments of a multi-tenant software architecture system that can be accessed by communicating with a user device.

The description that follows includes exemplary systems, methods, techniques, instruction sequences, and/or computer program products that embody techniques of the present disclosure. However, it is understood that the described embodiments may be practiced without these specific details. For instance, although some examples refer to accessing tenant services, other types of service providers are contemplated, such as of Software-as-a-Service (SaaS), among others. Furthermore, although the discussion mainly relates to providing dispute services to various entities that access the multi-tenant system, provisioning of other services using similar approaches is contemplated.

In a multi-tenant software architecture described herein, each tenant can share the applications, data, and/or infrastructure. A multi-tenant software provider can use a multi-tenant software platform to provision applications and/or resources to multiple entities. The multi-tenant software platform can facilitate addition of new tenants and onboard data and/or services provided by these new tenants. The multi-tenant software platform can implement rules and policies for data access by various entities across the tenants. The multi-tenant software platform can use identity services to provide access to these services, such as from an entity associated one tenant to a service provided by another tenant. The multi-tenant software platform can facilitate transaction services between tenants, such as a transaction service originating at one tenant that accesses resources at another tenant. The multi-tenant software platform can also provide dispute resolution capabilities to entities (e.g., customers) of any tenant.

A dispute may arise between entities of the same tenant or different tenants. For example, a customer of a first tenant (e.g., PAYPAL) may conduct a transaction with a merchant of another tenant (e.g., BRAINTREE), such as to purchase and pay for a certain product. As another example, a client of another tenant (e.g., VENMO) can initiate a transaction for a transfer of funds from the client's account to another client (e.g., a person-to-person P2P transaction). Thus, the transaction can involve a transfer of funds in P2P or business-to-consumer (B2C) transactions. In certain occasions, disputes may arise for these transactions.

A dispute may be for a disagreement between the first entity and the second entity. In the first example discussed above, the customer may allege that he or she did not receive an item purchased from the merchant. The customer may allege that the interaction was fraudulent and that he or she did not engage in the interaction. The customer may allege that the transaction amount charged to the customer's account was different than expected or agreed. As another example, the customer may allege that an item received was not as described, broken, defective, and/or there is another issue with the item received from the merchant. The customer may allege that a duplicate charge occurred for the transaction. The customer may allege that a refund was not processed by the merchant as promised for a previously resolved dispute. For the second example (i.e., P2P) discussed above, similar dispute reasons may arise, depending on type of the underlying transaction.

The multi-tenant software platform (also referred to as a multi-tenant platform) can include multiple tenants that have been previously on-boarded. The multi-tenant platform can facilitate access, using a unified identity associated with a user, to the entities, policies, and services of these tenants. The tenants can be hosted and managed by service providers. Access to the services can be determined based on privileges of the unified identity, as well as on policies of each of the tenants. The services can include various merchant services, such as in-store check-out (at a certain tenant) via a user device (associated with the unified identity), access to an online store of the tenant, order-ahead at a certain store of the tenant, a cash-in process (e.g., at an Automated Teller Machine (ATM)) at a certain tenant, a cash-out process (e.g., at an ATM), self-checkout for fuel at pay-at-the-pump stations of the tenant, among others.

The services can include SaaS and Platform as a Service (PaaS) services and/or other cloud services that are accessible by the user device. For example, the solution provider can provide access, to the user device, to various software applications, or deliver such software to the user device. The services can also include inter-tenant transaction services, where a transaction service that is originated at a first tenant needs to access transaction resources at a second tenant. The multi-tenant platform can access other services, such as multi-tenant identity services and/or multi-tenant transaction resource service to determine how to process inter-tenant transactions (as well as intra-tenant transactions).

The multi-tenant platform can thus utilize unified identity services to provide access to selected services and/or data of the tenants based on policies associated with each of the tenants. The multi-tenant platform can use separate databases to store data to achieve isolation, such as when new tenants are on-boarded onto the existing platform, and to provide logical and/or physical data isolation. Shared data access can be made possible by on-boarding the tenants and selectively cross-exposing services. For example, for a multi-tenant platform managed by PAYPAL, certain capabilities of the multi-tenant platform such as Risk-as-a-Service (RaaS) and/or Dispute-as-a-Service (DaaS) can be provided to third-party on-boarded tenants such as FACEBOOK, GOOGLE, and their respective organizations, such as marketplaces, shops, and others. Thus, in some embodiments, the multi-tenant platform can include a core tenant (such as PAYPAL) that offers core services and infrastructure (including Identity-as-a-Service (IaaS) functionality) and any additional data access to selected tenants and/or users accessing the multi-tenant platform from that tenant. The level of access to the core services and/or infrastructure can be determined by rules and/or policies of each tenant and/or of the multi-tenant platform.

The multi-tenant platform can onboard new tenants by using an identity manager that uses one or more data structures. In some embodiments, the multi-tenant platform can expose appropriate user experiences for a user application based on the user request. The multi-tenant platform can implement methods for providing IaaS services to various entities and/or tenants. The multi-tenant platform can provide the IaaS and other services (such as DaaS) by accessing services and entities that are modeled via various hierarchical data structures (or modeled by using other implementations). The multi-tenant platform can onboard third-party tenants and provide inbound and outbound services for these tenants and their respective organizations. For example, the multi-tenant platform can onboard GOOGLE and various organizations of GOOGLE such as INSTAGRAM and SHOPS, their respective merchants, as well customers of each merchant.

In some embodiments, the multi-tenant platform can provide dispute resolution capabilities to entities of any tenant. Several tenants can be on-boarded onto the multi-tenant platform, including first and second service providers. The multi-tenant platform can include an identity manager that manages customer representations corresponding to the entity identities for the plurality of customers of the second service provider. The first service provider can receive dispute request from the second service provider that manages entity identities of a plurality of customers. The dispute request indicates a disputed transaction between a customer of the plurality of customers and another entity. The multi-tenant platform can propagate the dispute request, with the customer representation, to a dispute management engine that determines an outcome for the dispute. The dispute management engine can determine the outcome based on characteristics of the disputed transaction and on characteristics of the customer. The dispute management engine can propagate the determination to the second service provider. The following description and associated Figures illustrate various embodiments directed to the ideas listed above.

FIG. 1 is a system diagram illustrating embodiments of a multi-tenant software architecture system that can be accessed by communicating with a user device. In an overview of the system diagram, a user device 104 can communicate with a processing system 100 that includes a multi-tenant platform 102. The processing system 100 can process requests using a multi-tenant transaction processor (MT-transaction processor) 101. The multi-tenant platform 102 can provide access to multiple service providers 108, 110, and 112. In some embodiments, the multi-tenant platform 102 can model each of the service providers 108-112 such that the MT-transaction processor 101 can access services 116-124, policies 123-127, and/or resources 162-166 of the service providers.

The multi-tenant platform 102 includes resources 155 and core services at elements 132-148, as well as additional representations of services 130(1)-130(4). The multi-tenant platform 102 can provide services to the service providers 108-112, such as IaaS services that may be required for accessing other services, including DaaS. Thus, the multi-tenant platform 102 can manage a plurality of tenants, each one of which can be associated with one or more services, which are then exposed for access. In some embodiments, each of the service providers 108-112 can be the actual providers that are then represented (e.g., by modeling) in the multi-tenant software architecture (i.e., in the multi-tenant platform 102). Although not shown in FIG. 1, each of the service providers 108-112 can include a respective transaction processor for processing own requests. The MT-transaction processor 101 can be a transaction processor that was fully integrated onto the multi-tenant platform 102. The MT-transaction processor 101 can be a default transaction processor for processing transactions.

The multi-tenant platform 102 can store user information for users at the accounts 142. In some embodiments, the accounts 142 includes information for users (also referred to as "core users") of a core tenant. The core tenant can be one of the service providers 108-112, or a service provider that is fully integrated into the multi-tenant platform 102. The multi-tenant platform 102 can facilitate provision of various core services to the core users. The core services can include identity services 132, risk services 138, compliance services 140, payment services 148 (including payout services), MT-MKT (multi-tenant marketplaces) 154, MT-XO (multi-tenant checkout service) 158, MT-Activity (multi-tenant activity tracker) 172, and/or MT-Dispute (multi-tenant dispute service, aka MT-DaaS) 180.

In one embodiment, the multi-tenant platform 102 provides IaaS services at the identity services 132 element. The identity services 132 can generate and maintain a core hierarchical data structure for managing its core entities. The core services can also include access to policy configuration 136, as well as access to accounts 142, merchants 144, and consumers 146. The accounts 142 are associated with the identity services 132. The multi-tenant platform 102 can also provide inter-tenant transaction services, such as between tenants 108 and 110, where the tenants 108 and 110 need not be fully integrated.

The service provider 108 can include entities 114, policies 123, services 116, and transaction resources 162. Similarly, the service providers 110 and 112 include entities 118 and 122, policies 125 and 127, services 120 and 124, and/or transaction resources 164 and 166, respectively. The elements 114, 123, 116, and 162 of the service provider 108, and similar elements of the service providers 110 and 112 can be modeled by the multi-tenant platform 102, as discussed below. In some embodiments, the MT-MKT 154 can model and manage the relationships between merchants/sellers of the service providers, while the identity services 132 model and maintain identity of various entities across the multi-tenant platform 102. In some embodiments, a certain service provider can be fully integrated onto the multi-tenant platform 102, a process which can include generating the core hierarchical data structure for the core tenant. In this example, the identity services 132 can manage the core users (e.g., in its own namespace), meaning that the service provider 108 does not have its own identity service for its own users.

The service providers 108, 110, and 112 can be onboarded onto the multi-tenant platform 102 and continue to manage their own identities (e.g., using their pre-existing 3P-IdPs as discussed below with reference to FIG. 2). Any access from the service provider 110 for access of a service other than its own services 120, such as access of a service 130(1), uses a unified identity for access of services and/or data across the multi-tenant platform 102. During the onboarding process, the multi-tenant platform 102 can generate models of the respective service provider(s) by the identity services 132 and the MT-MKT 154. In some embodiments, the MT-MKT 154 is logically modeled as a part of the identity services 132 (e.g., as a subset of its hierarchical data). In some embodiments, the MT-MKT 154 can be logically de-coupled from the identity services 132, but have links/associations with corresponding entities in the identity services 132.

The onboarding process can include accessing identity services to determine at least a portion of the entities that are being managed by the respective identity service. If the entities are not being migrated (e.g., by being fully integrated) to the identity services 132, then the identity services can generate representations of the entities being on-boarded in the core hierarchical data structure. These representations are then being used by the IaaS service to determine and use the unified identity (for a certain user) across the multi-tenant platform 102. The representations can include lightweight elements and/or linked elements. The process of generating and using user representations is explained in more detail below.

The identity services 132 can manage and access the policy configuration 136, such as to enforce access to certain customer and/or merchant domains. The policy configuration 136 can be accessed via the hierarchical data structures (discussed below) for each entity. The multi-tenant platform 102 can communicate, via the multi-tenant API 126, with the service providers 108-112 and/or the user device 104. The multi-tenant platform 102 can provide, based on a certain unified identity, information related to a tenant, associated services, and/or associated user experiences, to a requesting entity via the multi-tenant tenant API 126. Furthermore, the multi-tenant platform 102 can facilitate communication between various tenants 108-112 (i.e., via their respective representations), such as by providing IaaS services.

For example, a new tenant, such as the service provider 112, can be on-boarded by the multi-tenant platform 102. Information on the new tenant can be stored by one or more of the core services 132-148. In some implementations, upon onboarding, a namespace (e.g., its entities such as merchants and/or customers) that is associated of each tenant can be onboarded onto the identity services 132. In some embodiments, one or more of services of the new tenant, such as the service 124, can be exposed (e.g., as a model) for access to other users of the multi-tenant platform 102. In one embodiment, the core service provider (that is integrated into the multi-tenant platform 102) can process a payment and order fulfillment for products/services offered by the service provider 108 and provided via user experiences accessed at the UI 106. The core service provider can also provide dispute resolution capabilities via MT-Dispute 180 for the transactions that are either processed by the MT-Platform 102 or processed by one of the on-boarded service providers 108-112. Thus, the MT-dispute 180 can facilitate dispute management services that is independent of the tenants and their entities. The MT-dispute 180 can interface with any existing dispute management systems of the onboarded tenants, and provide dispute resolution including risk assessment capabilities, as well as chargeback functionality to transaction resources of each onboarded tenant.

In one embodiment, the multi-tenant platform 102 can also generate a representation 130(1)/(2)/(3)/(4) of the service 124 at the multi-tenant platform 102. Thus, any access from other tenants, such as from the user device 104 or from the service provider 110, to the service 124 is performed via a unified identity (e.g., by using IaaS) at the service representation 130(1)/(2)/(3)/(4). In some embodiments, for onboarded tenants that are fully integrated, access to services of that tenant can be performed by the MT-transaction processor 101 directly, without using representations of the fully integrated service. In some embodiments, for onboarded tenants that are not fully integrated, access to services of that tenant can be performed by the MT-transaction processor 101 by calling the representation 130(1)/(2)/(3)/(4) of the onboarded (but not fully integrated) service. The representation 130(1)/(2)/(3)/(4) can then access the actual service 124.

The user device 104 can be any type of a computing device that can communicate user requests to the multi-tenant platform 102. The user device 104 can be implemented as a kiosk, a point-of-sale (PoS) terminal, a mobile device, among others. The user device 104 includes a user interface (UI) 106 through which the user can interact with displayed user experiences, such as to access certain services provided via the multi-tenant platform 102. The user device 104 can generate and communicate a user request for a certain service at the multi-tenant platform 102. The user device 104 can interface with the service provider 108-112 and/or with the processing system 100. The transaction processor then can communicate with various components of the multi-tenant platform 102, such as via the multi-tenant API 126.

The multi-tenant platform 102 can provide CaaS, via the compliance service 140, to ensure compliance of the merchants of the service provider 108. The multi-tenant platform 102 can provide risk analysis (e.g., via the Risk core service 138) to determine whether to perform services and/or process payouts for product/services offered by merchants of the service provider 108. The core service provider can process payouts from the user account that is associated with the user device 104. The core service provider can provide the payout services to accounts at organizations that are associated with each of the merchants.

Once on-boarded as a core tenant, the accounts of the core service provider can be stored and accessed directly at the multi-tenant platform at the accounts 142 element. For example, a buyer (e.g., a user of the user device 104) can be associated with one payment account, and the seller (e.g., one of the tenants) can be associated with another payment account at the payment system (which can be implemented using the processing system 100). Upon successfully performing the risk analysis on the requested service (e.g., a payout transaction), the core service provider can then perform (e.g., via the payment core service 148) a fund transfer from the buyer's payment account to the merchant's payment account.

The payment system can be implemented by PAYPAL or another online payment system that allows users to send, accept, and request fund transfers. In some embodiments, the user experience can also provide access to certain services. Thus, in addition, or instead of, a payment service, the user experience can include other functionality that is unique for the certain tenant, such as selection of items for order, access to certain SaaS functionality, among others. Thus, the solution provider can provide funds in/funds out services, as determined based on the location data, from the payment system to the users of the user devices.

For simplicity, FIG. 1 only shows a single user device 104. However, as discussed herein, the multi-tenant platform 102 interfaces with multiple user devices, and thus provides access to services to many different users. Similarly, the multi-tenant platform 102 can onboard multiple tenants in addition to the ones shown. The multi-tenant platform 102 can also have multiple core tenants that are incorporated as part of the core services 132-148.

Figure 2:
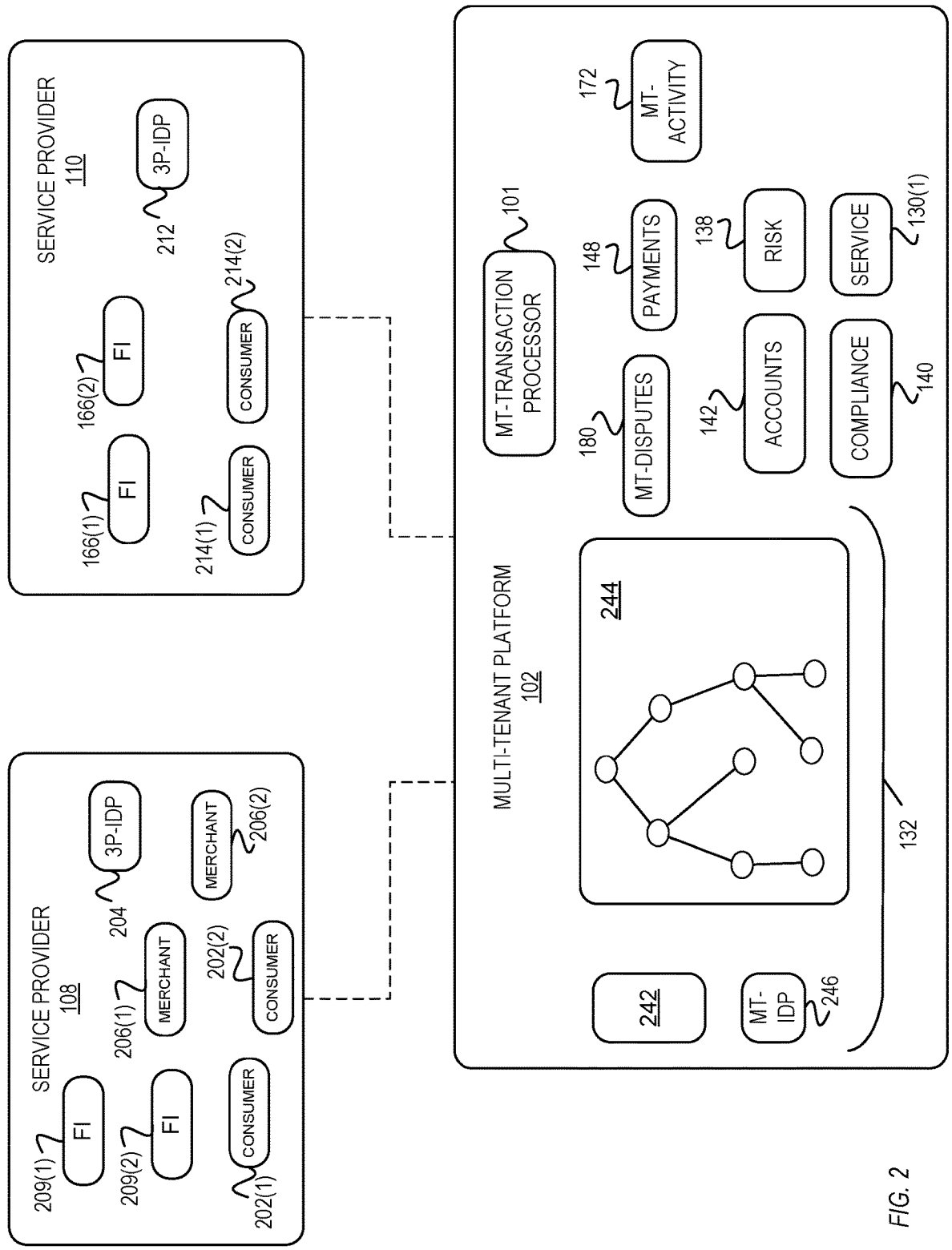
FIG. 2 is a system diagram illustrating embodiments of the multi-tenant software architecture of FIG. 1 for processing disputes.

FIG. 2 is a system diagram illustrating embodiments of the multi-tenant software architecture of FIG. 1 for processing disputes. FIG. 2 shows embodiments of how the identity services of certain organizations of the service providers 108 and 110 are modeled by the multi-tenant platform 102. As shown, a marketplace organization of the (actual) service provider 108 can include a third-party identity provider (3P-IDP) 204 that manages entities of merchant 206(1) and 206(2), and entities of consumer 202(1) and 202(2). Similarly, the (actual) service provider representation 110 can include a 3P-IDP 204 that manages entities of consumer 214(1) and 214(2).

In some embodiments, the service providers can operate, at least in part, independently of the multi-tenant platform 102, e.g., the service provider 108 can perform services 116 (e.g., based on the policies 123) for the entities 114 using the resources 162, without accessing data and/or services of the multi-tenant platform 102. In some embodiments, after onboarding, the onboarded service provider can continue to perform some services independently of the multi-tenant platform 102. For example, the onboarded service platform can continue to provide UI and other services to users, and can initiate and perform many intra-tenant transactions (e.g., transactions between customers and merchants of that onboarded tenant only). The onboarded service platform can notify the multi-tenant platform 102 of these transactions (e.g., by communicating with the MT-Activity 172) as well as update any entity changes with the identity services 132. The onboarded service platform may need to access the multi-tenant platform 102 for various multi-tenant services, such as the dispute services 180, risk services 138, among others. In some embodiments, once a service provider is fully integrated (i.e., migrated), the fully integrated service provider cannot operate independently of the multi-tenant platform 102.

FIG. 2 shows that the multi-tenant platform 102 includes the identity service 132, the accounts 142 element, the risk 138 element, the compliance element 140, MT-Disputes 180, payments 148, MT-activity 172, as well as service 130(1). It is noted that some of the services of FIG. 1 are not shown in FIG. 2 for simplicity. The service provider 108 can be modeled by the identity service 132 as part of the hierarchical data structure 244. As discussed below, the identity service 132 can model some parts of the service provider 108, including representations of the 3P-IDP 204 that indicates representations of the merchants 206(1) and 206(2), representations of the consumers 202(1) and 202(2), and/or representations of the FIs 209(1) and 209(2). Although the current disclosure discusses identity managers using hierarchical data structures to manage and facilitate operations on various entity representations, other implementations are contemplated, including tables, linked lists, and/or graphs, among others. Thus, the term hierarchical data structures encompasses various implementations, and is not meant to be limiting.

The identity service 132 can similarly model some parts of the service provider 110 (which can represent VENMO, for example). The identity service 132 can model each of the service providers 108 and/or 110 as service provider representations that can be generated during onboarding of the respective service providers 108 and/or 110. The 3P-IDPs 308 and 310 (of FIG. 3) can represent, in the hierarchical data structure 244, the actual IDPs 204 and 212 of the service providers 108 and 110, respectively. The identity service 132 includes an access tier 242 and the hierarchical data structure 244 that is managed by an MT-IDP 246. The access tier 242 is a part of the identity service 132 that customizes data associated with the service provider when being on-boarded with the multi-tenant platform 102. For example, the access tier 242 includes information about the products and/or services being offered by the service provider 108, as well as service endpoints for accessing services (e.g., the service 116) offered by the service provider 108. The service endpoints can be referenced by a corresponding node in the hierarchical data structure 244 that represents the service provider 108.

Since each of the service providers 108 and 110 includes own 3P-IDP 204 and 212 respectively, each of these tenants can continue to manage the identities of their own respective entities. For example, the service provider 110 can continue to manage the entities 214(1)-214(2), including managing identity information, contact data, and any characteristics of the consumers 214(1) and 214(2). Each of the FIs 209(1) and 209(2) can be associated with a respective merchant 206(1) and 206(2), such as to accept payout services.

Various embodiments of how the hierarchical data structure 244 is generated and accessed are discussed below with reference to FIG. 3. The MT-IDP 246 can generate and manage representations of the entities of the onboarded tenants, i.e., entities 206(1), 206(2), 202(1), and 202(2), as well as the 3P-IDP 204 of the service provider 108. Similarly, the MT-IDP 246 can generate and manage representations of entities 214(1), 214(2), 212 of the service provider 110. The service provider 110 can update any changes to the entities 214(1) and 214(2) to the multi-tenant platform 102, such as via a representation of the 3P-IDP 204 in the hierarchical data structure 244. These 3P-IDP 212 originated updates are used to keep the data of their respective representations up-to-date. Similarly, any services (such as core services) performed via the representations of the hierarchical data structure 244 can be propagated back to the 3P-IDP 212.

The identity services 132 allow users to be onboarded as entities onto any of representations of the service providers 108-112. As the service provider itself is a tenant in the multi-tenant architecture 102, a representation of the user would be created by the identity services 132 (such as under a 3P-IDP representation for that tenant representation in the hierarchical data structure 244). That 3P-IDP can be indicated as a system-of-record (SOR) for that onboarded user. The multi-tenant platform 102 can use the identity services 132 to identify the same user and his/her transaction resources across various namespace, thus enabling the same user to have multiple accounts in different namespaces and potentially linking or federating these accounts.

In some implementations, the multi-tenant platform 102 can enable co-ordination of multiple identity namespaces (e.g., separate namespaces associated with the service provider 108, the service provider 110, as well another namespace associated with the fully integrated service provider of the multi-tenant platform 102) to efficiently and securely transfer transaction resources between identities corresponding to entities of these namespaces. For example, a user in one domain (e.g., a namespace associated with the service provider 108) can, via the multi-tenant platform 102, lookup users in other namespaces (e.g., a user in a namespace associated with the service provider 110, or a merchant associated with the service provider 112) and establish a relationship including transaction resource transfers. The multi-tenant platform 102 can use separate identity and marketplace domains, among others, for separate transaction types.

The MT-activity 172 can record inter-tenant and/or intra-tenant transactions that are performed by entities of the onboarded service providers 108 and 110 (as well as by any entities of fully integrated tenants). In some embodiments, the MT-activity 172 can receive indications from the onboarded service providers 108 and/or 110 regarding any local intra-tenant transactions, e.g., P2P transactions between consumers 214(1) and 214(2) that may not utilize services of the multi-tenant platform 102. The service provider 110 can send notifications for any inter-tenant transactions, e.g., between entities of tenants 110 and 108 (such as between the consumer 214(1) and the merchant 206(1)), or between an entity of the tenant 110 and an entity of the multi-tenant platform 102. At least some transactions, e.g., that use the services of the multi-tenant platform 102, can be recorded automatically by the MT-activity 172. The transaction information can include some details of the transaction, such as the entities involves, time of transaction, transaction amount, type of transaction, receipts, among others. The MT-activity 172 can internally standardize the recorded transaction information, since each of the tenants can provide a different type of notification with different type of data.

Upon receiving a dispute request, the multi-tenant platform (e.g., MT-dispute 180) can access the MT-activity 172 to obtain information regarding the disputed transaction. For certain disputed transactions (e.g., where none or incomplete transaction information was recorded by the MT-activity 172), the MT-dispute 180 determines to access the originating service provider (e.g., the service provider 110 from which the dispute request originated) to obtain disputed transaction information.

The MT-dispute 180 can make a dispute determination for the dispute request. The dispute determination can include communicating with the risk 138 to determine risk characteristics of the entities involved with the dispute. For example, the MT-dispute 180 can call the risk 138 (using a representation of the consumer 214(1)) to determine a risk level of the consumer 214(2). In some cases, the risk 138 can perform this determination based on the representation (e.g., a lightweight consumer as discussed below with reference to FIG. 4) of the consumer 214(1). In other cases, the risk 138 determines to access the 3P-IdP 212 of the service provider 110 to obtain additional information regarding the consumer 214(2). The MT-dispute 180 can determine the dispute outcome, which can then be propagated to the requesting service provider. The multi-tenant platform 102 can also provide payment services 148 that can be accessed by the MT-dispute 180 to process any payments, such as chargebacks. The payment services 148 can also access FIs of the service provider, such as FI 166(1).

Figure 3:
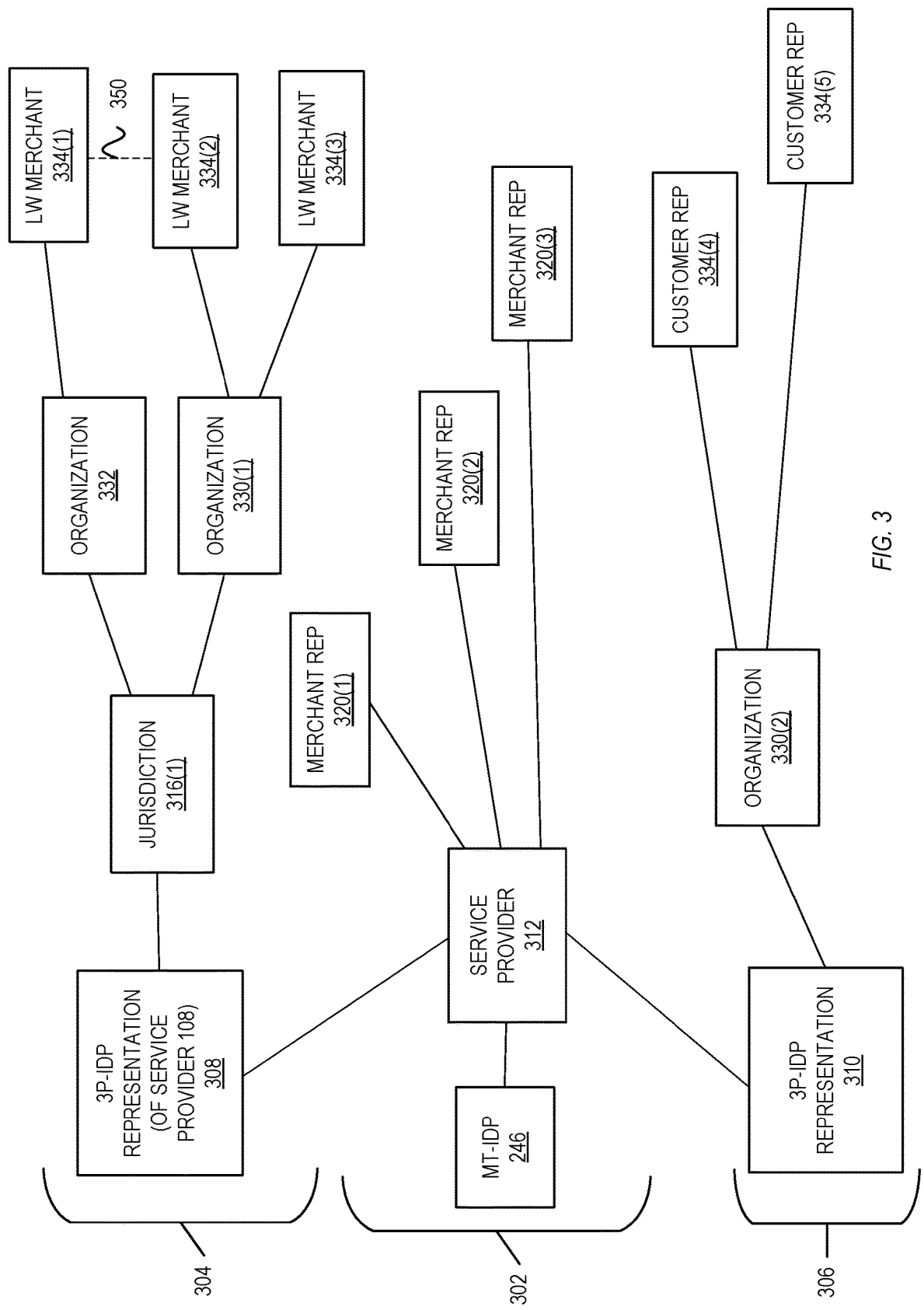
FIG. 3 is a diagram illustrating data structures used by the multi-tenant marketplace architecture systems.

FIG. 3 is a diagram illustrating hierarchical data structures used by the multi-tenant marketplace architecture systems. FIG. 3 illustrates several hierarchical data structures 302, 303, and 304 (which collectively can be referred to as the hierarchical data structure), which are accessible via the MT-IDP 246. FIG. 3 illustrates the relationships between the entities of the hierarchical data structures 302-306. The organization and linking of the hierarchical data structures of FIG. 3 can be referred to as a dependency graph. It is noted that the organization and type of the hierarchical data structures 302-306 is shown for illustrative purposes only, and that one or more of 3P-IDP representations 308 and 310 can be implemented using different data structures, as desired.

The first hierarchical data structure 302 illustrates service provider 312 that is fully integrated. It is noted that via the identity services 132, the fully integrated service provider can offer core services to various users of the multi-tenant architecture. As shown, the service provider 312 includes merchant representations 320(1)-320(3), which can include complete information on the actual merchant. The fully integrated merchant representations 320(1)-320(3) can be operated on directly by the multi-tenant platform 102. For example, the merchant representations 320(1)-320(3) can be fully integrated PAYPAL merchants.

The hierarchical data structure 304 can correspond to various entities of the on-boarded service provider 108, and is able to model complex relationships between the sellers, merchants, and various organizational entities of the service provider 108 (such as GOOGLE). The hierarchical data structure 304 is managed by the 3P-IDP representation 308. Thus, the 3-IDP representation 308 can be a representation, in the hierarchical data structure 244, of a portion of the 3P-IDP 204 that corresponds to the various sellers and merchants of the various organizations of the service provider 108. The Identity-as-a-Service (IaaS) services can be used by the MT-IDP 246 to properly create the relationships between the merchants being onboarded. As shown, the 3P-IDP 308 can itself be associated with the service provider 312.

The hierarchical data structure 304 can include various entities, including a jurisdiction 316(1) and organization 332 and 330(1). The hierarchical data structure 304 includes lightweight merchants LW 334(1)-334(3). A lightweight merchant is an entity that represents a corresponding entity that is managed by another identity manager, such as using another hierarchical data structure, and that contains some of the data for that corresponding entity. The jurisdiction entity 316(1) indicates a certain jurisdiction, such as the USA or the EU.

The hierarchical data structure 304 includes LW merchant 334(1) in an organization 332 (which can be a certain business unit of the service provider 108) that is linked (i.e., using a link 350) in an organization 330(1) (which can be a marketplace of service provider 108). The link 350 can indicate that selected inbound services performed on the merchant representation 320(1) can be propagated onto the linked LW merchant 334(2). Thus, the link 350 is between two lightweight merchant representations.

Similarly, the hierarchical data structure 306 can correspond to various entities of the on-boarded service provider 110, and can be used to model complex relationships between the sellers, merchants, and various organizational entities of the regional service provider 110. The hierarchical data structure 306 is managed by the 3P-IDP representation 310. The hierarchical data structure 306 can include various entities, including an organization 330(2). The hierarchical data structure 306 also includes customer representations (e.g., linked customers) 334(4) and 334(5).

During the process of onboarding the service providers 108 and 110, the multi-tenant platform 102 can generate the hierarchical data structures for identity and for sharing inbound/outbound services (referred to herein as marketplace services). As shown in FIG. 3, the multi-tenant platform 102 can generate the lightweight representations for that service provider's merchants and sellers. In some embodiments, the identity services generate separate identity hierarchical data structures where integrated identities of the merchants, their customers, and various transaction services are managed. Although the actual identities of the merchants are managed by that tenant's 3P-IDP, transactions are provided to the service provider and their merchants via the marketplace services.

The MT-dispute 180 can receive a dispute request from the service provider 110 (or from another source). The MT-dispute 180 can access the identity services 132 to access identity of the customer (i.e., via a representation of the customer). For example, the MT-dispute can access the customer representation 334(5). The MT-dispute can use the dispute request, or create an internal dispute request (e.g., an MT-dispute request) based on the dispute request. The MT-dispute request can then be used as multitenant service call that can be routed and processed by various services of the multi-tenant platform 102. In some embodiments, the dispute request can be created by a provider dispute manager that is hosted by the service provider, such as the service provider 108. The MT-dispute 180 can interface with such provider dispute managers, including for communicating an outcome of the dispute request to the requesting 3P-dispute manager.

Figure 4:
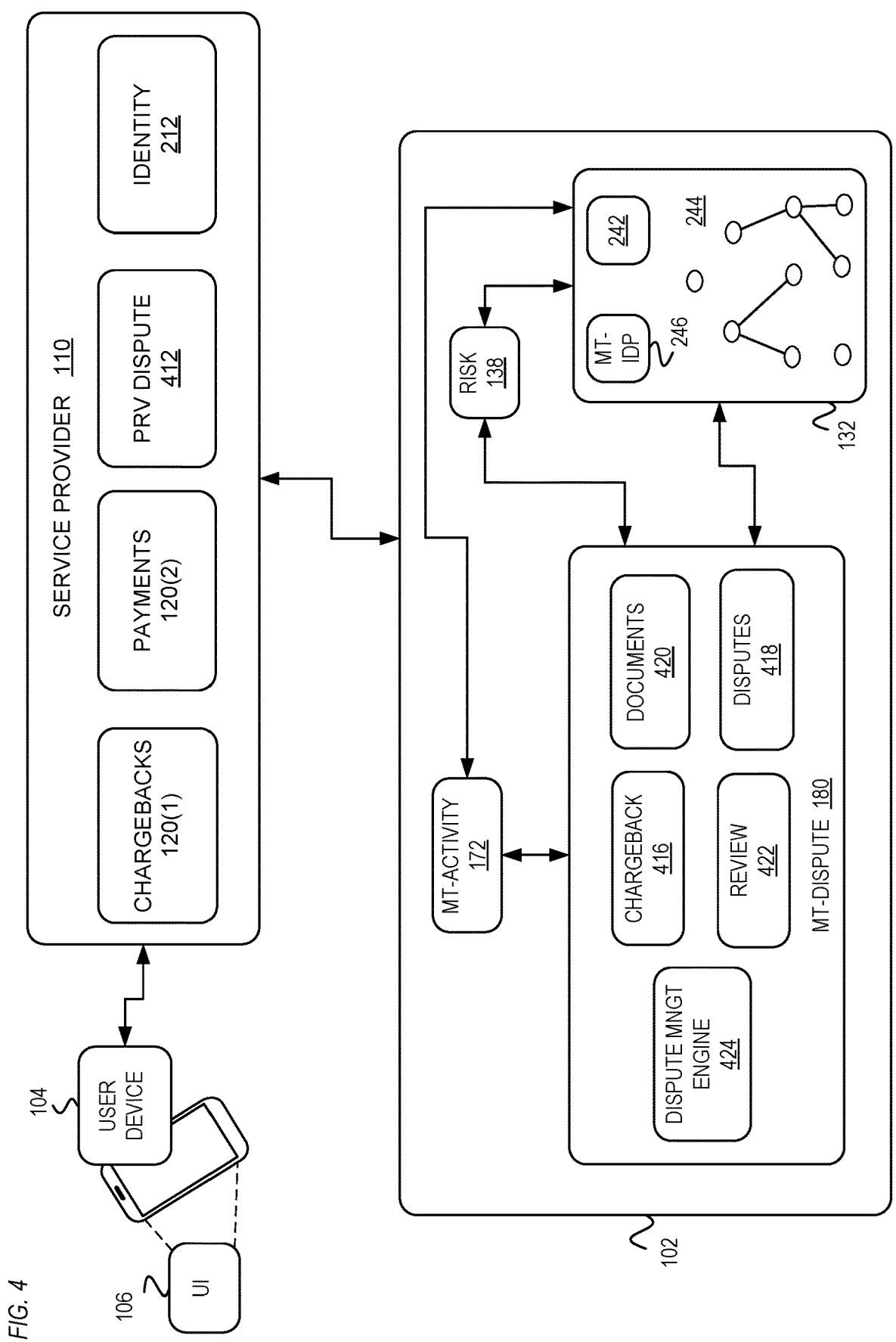
FIG. 4 is a diagram illustrating embodiments a model of a multi-tenant dispute services for multi-tenant architecture systems.

FIG. 4 is a diagram illustrating embodiments a model of a multi-tenant dispute service for multi-tenant architecture systems. FIG. 4 illustrates a simplified model of the MT-dispute 180 and some elements of the multi-tenant platform 102 for processing dispute requests. FIG. 4 also illustrates elements of the service provider 110 that can interact with the MT-dispute when processing dispute requests. The service provider 110 can include various services 120, including chargebacks 120(1) and payments 120(2), local identity services 212, and a provider dispute server 412. It is noted that the service provider 110 elements are shown for explanation purposes only, and fewer or additional elements can be used to achieve similar functionality discussed. The MT-dispute 180 can include a chargeback 416, disputes 418, documents 420, review 422, and dispute management engine 424 elements. The MT-dispute 180 can communicate with MT-activity 172, risk 138, and identity services 132.

The provider dispute server 412 can provide dispute management functionality to the entities that are managed by the identity 212 (e.g., customers managed by the service provider 110). The provider dispute server 412 can provide dispute UIs that are accessed at the user devices. For example, the user can access a dispute UI via the UI 106. The provider dispute server 412 can receive user selections from the UI 106 for the dispute. The provider dispute server 412 can create a service dispute request (based on the user selections for a certain dispute) that can be communicated to the MT-dispute 180 (such as via the multi-tenant API 126). The service dispute request can indicate dispute specifications and customer identity (e.g., as managed by the identity 212). The payments 120(1) can be used to manage payments for various transactions for the tenant 110, such as for its customers. The chargebacks 120(1) can be used to process and/or receive chargebacks from the chargeback 416 element of the MT-dispute 180.

The dispute management engine 424 can make dispute determinations for any internal (e.g., fully integrated) or external tenants (e.g., service providers 108-112) and their entities. The dispute management engine 424 can make these determinations independent of whether the transaction was processed by the multi-tenant platform 102, or by an external entity (such as by the tenant 110). The dispute management engine can access the identity services 132 to obtain a representation (e.g., in the hierarchical data structure 244) of the customer identity as identified in the service dispute request.

The dispute management engine 424 can support chargebacks and other funding functionality both for internal resources and for external resources (e.g., via the chargeback 120(1)). The dispute management engine 424 can make dispute determinations based on accessing the MT-activity 172 which can have transaction records on internal and/or external transactions by onboarded and/or internal tenants and their entities. The dispute management engine 424 can access the documents 420 that can store various transaction documents for current and/or previous transactions for the entities involved in the dispute. The dispute management engine 424 can access the documents to obtain additional context for making a dispute determination. The dispute management engine 424 can communicate with the provider dispute server 412 to provide results of the dispute determination. These results can then be provided by the provider dispute server 412 to the user via the UI 106.

Figure 5:
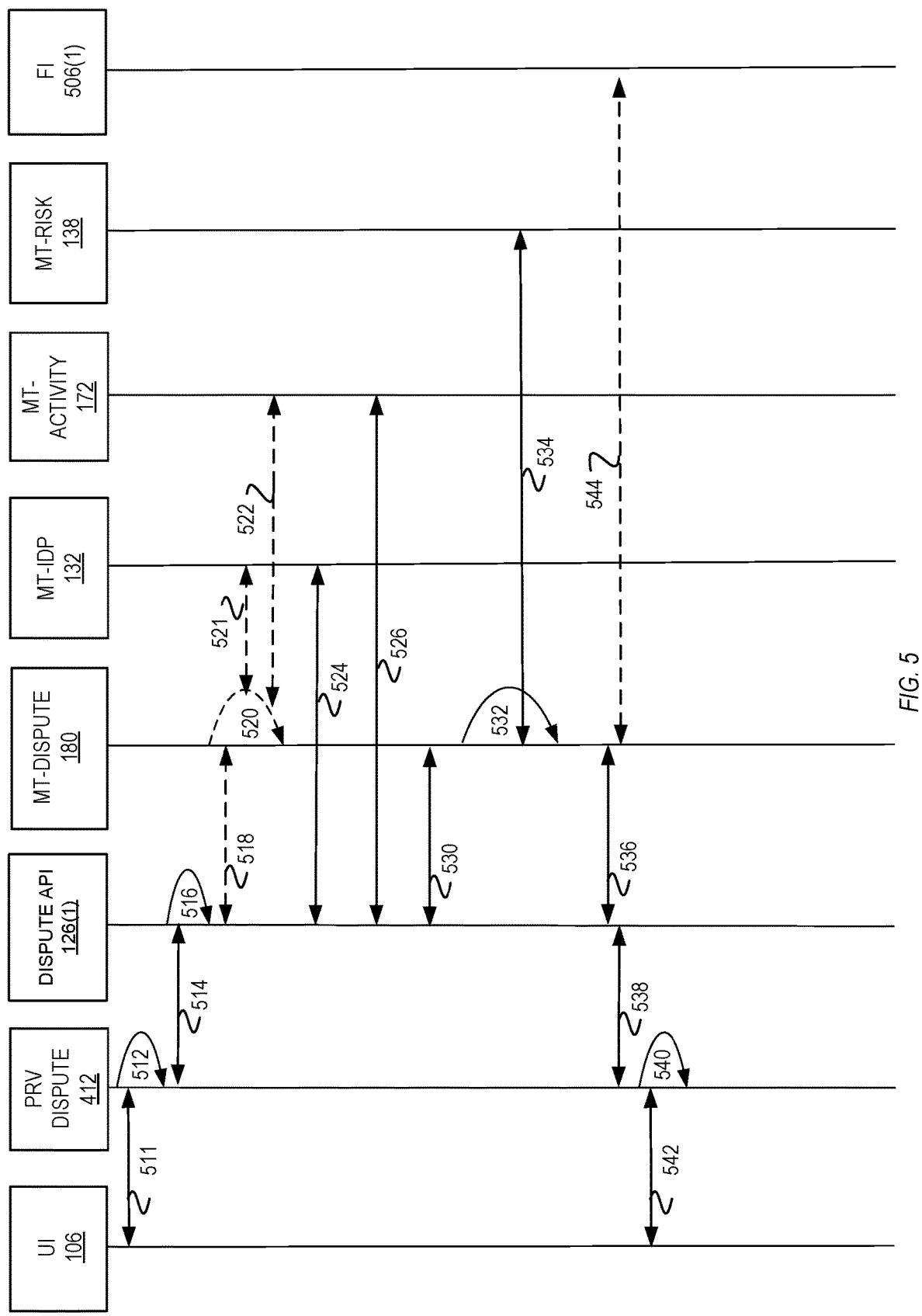
FIG. 5 is a timing diagram illustrating embodiments of flow of operations of using multi-tenant dispute services in multi-tenant architecture systems.

FIG. 5 is a timing diagram illustrating embodiments of flow of operations of using multi-tenant dispute service in multi-tenant architecture systems. FIG. 5 illustrates an example logical flow of operations between various entities of the multi-tenant platform 102 that uses the MT-dispute 180. FIG. 5 illustrates communication between the UI 106, the provider dispute server 412, a dispute API 126(1) (which can be a portion of the multi-tenant API 126)), MT-Dispute

180, MT-IDP 132 (i.e., the identity services 132), the MT-activity 172, the MT-risk 138, and an FI 506(1) (which can be one of resources 164 of the tenant 110)).

At 511, the UI 106 can receive user input indicating a dispute and communicate the user input to the provider dispute manager 412. At 512, the provider dispute manager 412 can create a service dispute request that includes customer identities based on the provider's local identity manager 212. At 514, the provider dispute manager 412 can communicate the service dispute request to the multitenant platform 102 via the dispute API 126(1).

In some embodiments, the dispute API 126(1) can then communicate the service dispute request with the MT-dispute 180. In one implementation, the MT-dispute 180 can then process the service dispute request including accessing the MT-IDP 132 to obtain the entity representation in the multi-tenant system, and accessing the MT-activity 172 to obtain transactions recorded for that entity representation). Alternatively, depending on the implementation, instead of the MT-dispute 180 performing 529, 522, and 522, the dispute API 126(1) can perform 524, 526, and 530. The dispute API 126(1) can, at 524, access the MT-IDP 132 to obtain the entity representation in the multi-tenant system, and at 526 access the MT-activity 172 to obtain transactions recorded for that entity representation). At 530, the dispute API 126(1) can then communicate the multi-tenant information and the service dispute request to the MT-dispute 180.

At 532, the MT-dispute 180 can generate the dispute request that is based on the service dispute request, as well as the transaction and entity representation information that is relevant to the multi-tenant platform 102. At 534, the MT-dispute 180 can communicate with the risk 138 to obtain risk information (via the identity representation such as customer representation 334(4) for the customer 214(1)). The MT-dispute 180 can also access the documents 420 via the entity representation to obtain any records for historical data for the entities involved in the dispute. At 532, the MT-dispute 180 can make a dispute determination for the requested dispute. The MT-dispute 180 can also record the outcome in the documents 420 for future reference. It is noted that the recorded dispute determination can be used for future disputes and other services (such as risk determinations) for the involved entities (including as entities of another tenant).

At 536, the dispute determination can be communicated to the dispute API 126(1). At 538, the dispute API 126(1) can then communicate the dispute determination to the provisional dispute manager 412, including converting the determination result and the entity identity for the service provider 110 requirements). At 540, the provisional dispute manager can process the determination results and provide them (at 542) to the user via the UI 106. At 544, the MT-dispute 180 can perform a chargeback transaction to a financial instrument 506(1) of the service provider (which can implement the FI 166(1)).

Figure 6:
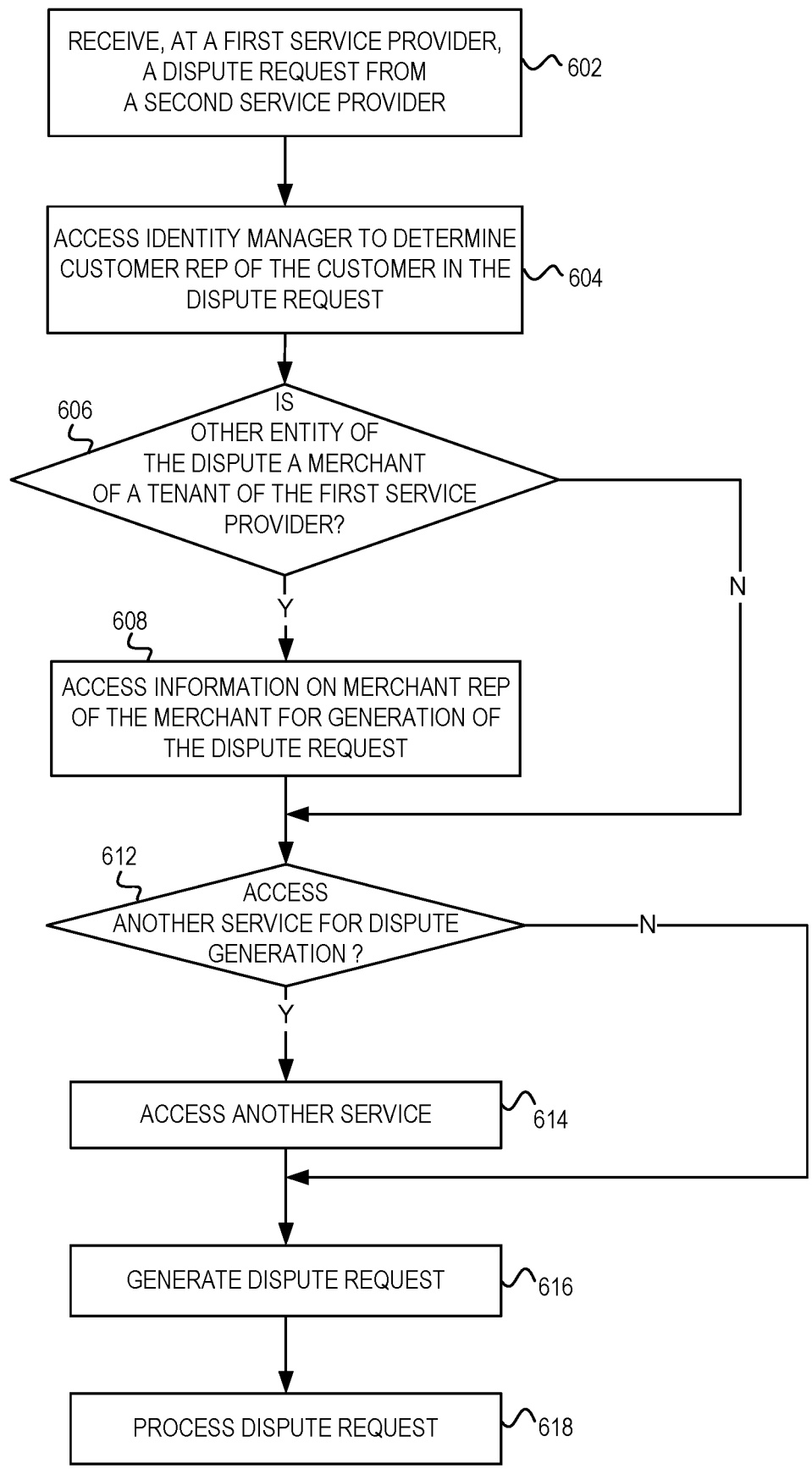
FIG. 6 is a diagram illustrating embodiments of flow of operations of using multi-tenant dispute services in multi-tenant architecture systems.

FIG. 6 is a diagram illustrating embodiments of flow of operations of using multi-tenant dispute service in multi-tenant architecture systems. The method of FIG. 6 is described with reference to the systems and components described in FIGS. 1-5 (for illustration purposes and not as a limitation). The example operations can be carried out by the transaction processor that uses the multi-tenant platform 102.

At 602, the MT-dispute 180 receives a dispute request from a service provider. With reference to FIG. 2, the MT-dispute 180 can receive a service dispute request from the service provider 110, such as from the provider dispute manager 412. The service dispute request can be for an entity identity (e.g., a customer) that is manager by the identity 212. The service dispute request can be between two users of the service provider 110, or between a user of the service provider 110 and a merchant that is managed by another service provider.

At 604, the MT-dispute 180 accesses an identity manager to determine customer representation of the customer in the dispute request. With reference to the example above, the MT-dispute 180 can access the identity services 132 to determine a customer representation (e.g., the customer representation 334(1)) that corresponds to the customer entity at the service provider 110 and identified by the service dispute request.

At 606, the MT-dispute 180 determines whether the other entity in the dispute request is a merchant of a tenant of the multi-tenant platform 102. With continued reference to the example above, the service dispute request can be between the customer representation 334(1) and the merchant representation 320(2) (which is managed by a fully integrated service provider 312). If the MT-dispute 180 determines that the other entity is a merchant of another tenant, flow continues at 612, otherwise the flow continues at 614. In a variation of 606, the MT-dispute 180 can determine that the other entity in the dispute request is another customer or other entity (but not a merchant).

At 608, the MT-dispute 180 access information on a merchant representation of the merchant for determination of the dispute request. With reference to the example above, the MT-dispute 180 can access the identity services 132 to determine the onboarded merchant, as well as any related information (e.g., as related to the multi-tenant platform 102). At 608, the MT-dispute 180 can modify the dispute request using the obtained merchant information.

At 612, the MT-dispute 180 can determine whether another service is required for generation of the dispute request. If the MT-dispute 180 determines that another service is required, flow continues at 614, otherwise the flow continues at 616. At 614, the MT-dispute 180 can access another service, such as the risk 138, policies 136, rules 134, that may be required for generation of the dispute request.

At 616, the MT-dispute 180 generates the dispute request. The MT-dispute 180 can generate the request based on the service dispute request, the customer representation(s), optionally on the merchant representation, and results of any additional services at 614. At 618, the MT-dispute 180 processes the dispute request, including determining results of the dispute request. At 618, and other steps shown in FIG. 6, the MT-dispute 180 can implement callback communication to the provider dispute manager 412 to indicate progress of the initial dispute request.

It should be understood that FIGS. 1-6 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the flow diagrams of FIGS. 5 and 6 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 7:
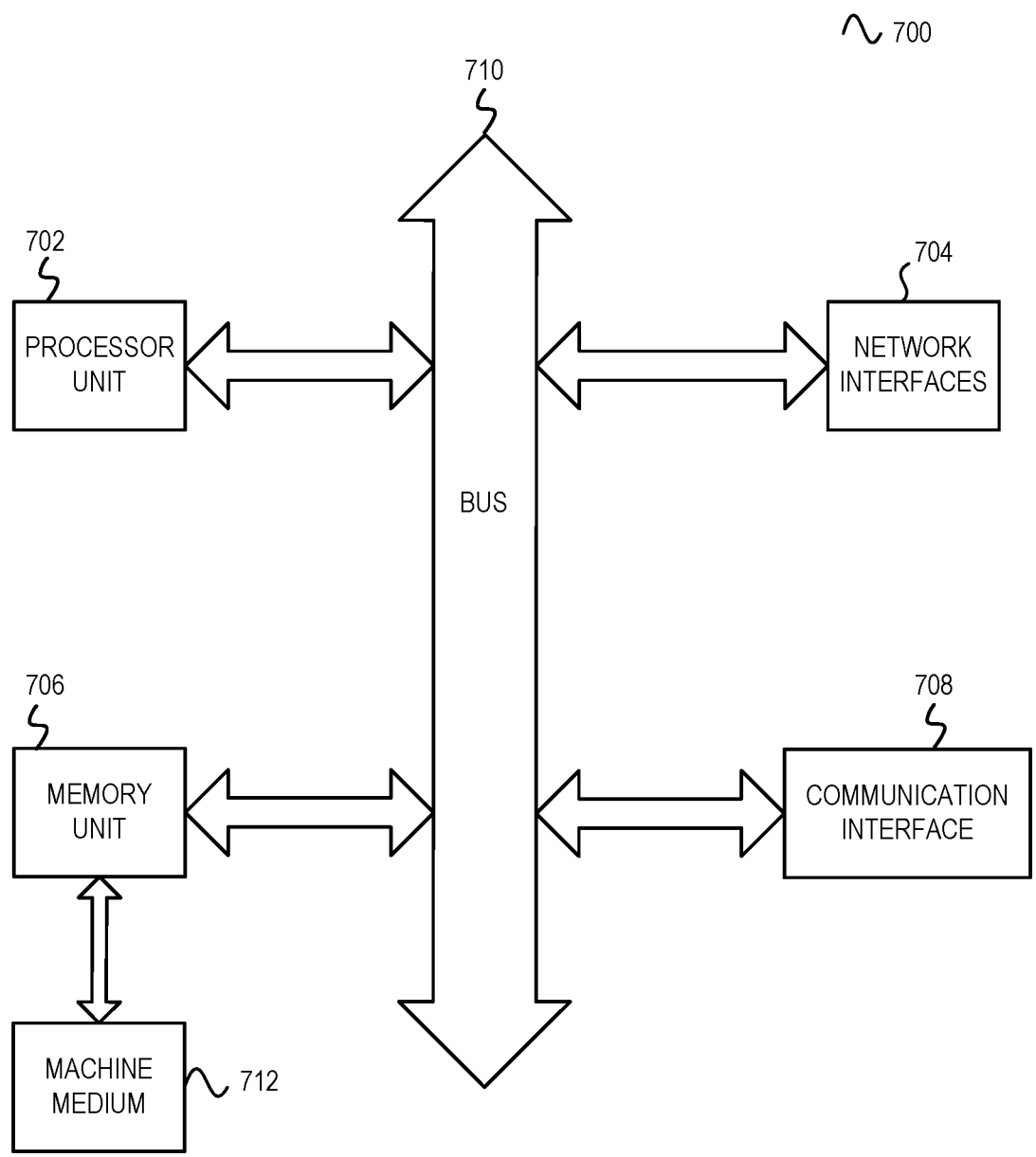
FIG. 7 is a block diagram illustrating embodiments of electronic devices used in the communication systems of FIGS. 1-6.

FIG. 7 is a block diagram of one embodiment of an electronic device 700 used in the communication systems of FIGS. 1-6. In some implementations, the electronic device 700 may be a laptop computer, a tablet computer, a mobile phone, a kiosk, a powerline communication device, a smart appliance (PDA), a server, and/or one or more other electronic systems. For example, a user device may be implemented using a mobile device, such as a mobile phone or a tablet computer. For example, a payment system may be implemented using one or more servers. The electronic device 700 can include a processor unit 702 (possibly including multiple processors, multiple cores, multiple nodes, and/or implementing multi-threading, etc.). The electronic device 700 can also include memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 can also include a bus 710 (e.g., PCI, ISA, PCI-Express, HyperTransport®, InfiniBand®, NuBus, AHB, AXI, etc.), and network interfaces 704 can include wire-based interfaces (e.g., an Ethernet interface, a powerline communication interface, etc.). The electronic device 700 includes a communication interface 708 for network communications. The communication interface 708 can include at least one of a wireless network interface (e.g., a WLAN interface, a Bluetooth interface, a WiMAX interface, a ZigBee interface, a Wireless USB interface, etc.), In some implementations, the electronic device 700 may support multiple network interfaces—each of which is configured to couple the electronic device 700 to a different communication network.

The memory unit 706 can embody functionality to implement embodiments described in FIGS. 1-6 above. In one embodiment, the memory unit 706 can include one or more of functionalities for processing disputes in multi-tenant architecture systems. Any one of these functionalities may be partially (or entirely) implemented in hardware and/or on the processor unit 702. For example, some functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, memory unit 706, the network interfaces 704, and the communication interface 708 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the present disclosure is not limited to them. In general, techniques for processing disputes in multi-tenant architecture systems as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for processing disputes in a multi-tenant architecture system, the method comprising:
   receiving, at a first service provider that provides services to a plurality of first merchants, a dispute request from a second service provider that provides services to a plurality of second merchants and that manages entity identities of a plurality of customers, the dispute request indicating a disputed transaction between a customer of the plurality of customers and another entity;
   accessing an identity manager to determine a customer representation of the customer, the plurality of customers previously onboarded onto the identity manager as a respective plurality of customer representation, the identity manager hosted by the multi-tenant architecture system that manages customer representations corresponding to the entity identities for the plurality of customers of the second service provider;
   accessing an activity manager, using the customer representation, to access copies of transactions performed by the second service provider between respective ones of the plurality of customers and a plurality of entities, wherein the plurality of entities comprises at least some of the plurality of customers;
   propagating the dispute request with the customer representation to a dispute management engine that determines an outcome for the dispute, the determination based on characteristics of the disputed transaction and on characteristics of the customer; and
   propagating the determination to the second service provider.

2. The method of claim 1,
   wherein said accessing the identity manager comprises determining the customer representation from a first hierarchical data system that is managed by the identity manager; and
   wherein the first hierarchical data system stores entity identities for the plurality of customer representations.

3. The method of claim 1, further comprising:
   determining the outcome for the dispute based on accessing a risk service provided by the first service provider, the risk service providing risk determination services for at least some of the plurality of customers via respective ones of the plurality of customer representations.

4. The method of claim 1, further comprising:
   determining to access a service of an onboarded second service provider as part of said determining the outcome for the dispute.

5. The method of claim 1, further comprising:
   determining that the other entity is a merchant that is represented by a merchant representation under a third service provider that is onboarded in the identity manager, the merchant being a merchant of the plurality of first merchants or a merchant of the plurality of second merchants; and
   modifying the dispute request with information associated with the merchant representation.

6. The method of claim 5, further comprising:
   determining additional services of the first service provider that were previously accessed by the merchant via the merchant representation; and
   determining the information based on the additional services.

7. The method of claim 1, further comprising:
   onboarding the second service provider onto the identity manager including onboarding the plurality of customers as the respective plurality of customer representation, wherein said onboarding the second service provider comprises determining dispute related policies and capabilities that are modeled by the identity manager.

8. The method of claim 1, further comprising:
   communicating a callback communication to the second service provider during processing of the dispute request to indicate propagation of the dispute request.

9. A system comprising:
   a non-transitory memory storing instructions; and
   a processor configured to execute the instructions to cause the system to perform operations comprising:
      accessing an identity manager to determine a customer representation of a customer that is party of a disputed transaction, the customer comprising a plurality of customers previously onboarded onto the identity manager as a respective plurality of customer representations, the identity manager hosted by a first service provider that hosts a plurality of first merchants and that manages customer representations identities corresponding to entity identities for the plurality of customers, the entity identities managed by a second service provider that hosts a plurality of second merchants;
      accessing an activity manager, using the customer representation, to access copies of transactions performed by the second service provider between respective ones of the plurality of customers and a plurality of entities, wherein the plurality of entities comprises at least some of the plurality of customers; and generating a dispute request for the disputed transaction between the customer of the plurality of customers and the other entity, the dispute request generated based on the customer representation and details of the disputed transaction.

10. The system of claim 9, wherein said accessing the identity manager to determine the customer representation comprises determining the customer representation from a first hierarchical data system that is managed by the identity manager; and wherein the first hierarchical data system stores entity identities for the plurality of customer representations.

11. The system of claim 9, wherein the operations further comprise:
determining the outcome for the dispute based on accessing a risk service provided by the first service provider, the risk service providing risk determination services for at least some of the plurality of customers via respective ones of the plurality of customer representations.

12. The system of claim 9, wherein the operations further comprise:
determining to access a service of an onboarded second service provider as part of said determining the outcome for the dispute.

13. The system of claim 9, wherein the operations further comprise:
determining to transfer resources using an access point to an external entity via a model of the resources of a third resource.

14. The system of claim 9, wherein the operations further comprise:
determining that the other entity is a merchant that is represented by a merchant representation under a third service provider that is onboarded in the identity manager, the merchant being a merchant of the plurality of first merchants or a merchant of the plurality of second merchants; and
determining additional services of the first service provider that were previously accessed by the merchant via the merchant representation, wherein processing of the dispute request is based on information related to the additional services.

15. A non-transitory machine-readable medium having instructions stored thereon, the instructions executable to cause performance of operations comprising:
accessing an identity manager to determine a customer representation of a customer and a merchant representation of a merchant that are parties of a disputed transaction, the customer comprising a plurality of customers previously onboarded onto the identity manager as a respective plurality of customer representation, the merchant comprised in a plurality of merchants previously onboarded onto the identity manager as a respective plurality of merchant representation, the identity manager hosted by a first service provider that manages customer representations identities corresponding to the plurality of customers that are managed by a second service provider that manages original identities, the identity manager further managing merchant representations, wherein the first service provider hosts a first transaction processing platform, and wherein the second service provider hosts a second transaction processing platform;
accessing an activity manager, using the customer representation, to access copies of transactions performed by the second service provider between respective ones of the plurality of customers and a plurality of entities, wherein the plurality of entities comprises at least some of the plurality of customers; and
generating a dispute request for the disputed transaction between the customer of the plurality of customers and another entity, the dispute request generated based on the customer representation, the merchant representation, and details of the disputed transaction.

16. The non-transitory machine-readable medium of claim 15,
wherein said accessing the identity manager to determine the customer representation comprises determining the customer representation from a first hierarchical data system that is managed by the identity manager, wherein the first hierarchical data system stores entity identities for the plurality of customer representations; and
wherein said accessing the identity manager to determine the merchant representation comprises determining the merchant representation from a second hierarchical data system that is managed by the identity manager, wherein the second hierarchical data system stores entity identities for the plurality of merchant representations.

17. The non-transitory machine-readable medium of claim 15, wherein the operations further comprise:
determining the outcome for the dispute based on accessing a risk service provided by the first service provider, the risk service providing risk determination services for at least some of the plurality of customers via respective ones of the plurality of customer representations.

18. The non-transitory machine-readable medium of claim 15, wherein the operations further comprise:
determining to transfer resources using an access point to an external entity via a model of the resources of a third resource.

19. The non-transitory machine-readable medium of claim 15, wherein the operations further comprise:
communicating a callback communication to the second service provider during processing of the dispute request to indicate propagation of the dispute request.

* * * * *